United States Patent
Kvist (10) Patent No.: US 8,490,728 B2
(45) Date of Patent: Jul. 23, 2013

(54) HYBRID ELECTRICAL WORKING MACHINE

(75) Inventor: Roland Kvist, Braås (SE)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 12/812,642

(22) PCT Filed: Feb. 29, 2008

(86) PCT No.: PCT/SE2008/000171
§ 371 (c)(1),
(2), (4) Date: Jul. 13, 2010

(87) PCT Pub. No.: WO2009/108089
PCT Pub. Date: Sep. 3, 2009

(65) Prior Publication Data
US 2010/0307846 A1    Dec. 9, 2010

(51) Int. Cl.
*B60K 1/00*    (2006.01)
(52) U.S. Cl.
USPC .................................... 180/65.31; 180/65.22
(58) Field of Classification Search
USPC .............. 180/65.21–65.22, 65.1, 65.6, 65.31, 180/243, 235, 248, 245
See application file for complete search history.

(56) References Cited

U.S. PATENT DOCUMENTS

| | | | |
|---|---|---|---|
| 4,762,191 A * | 8/1988 | Hagin et al. | 180/14.2 |
| 5,147,003 A * | 9/1992 | De Monclin | 180/14.2 |
| 6,263,267 B1 * | 7/2001 | Anthony et al. | 701/22 |
| 6,321,865 B1 * | 11/2001 | Kuribayashi et al. | 180/243 |
| 6,419,037 B1 * | 7/2002 | Kramer et al. | 180/14.2 |
| 6,453,228 B1 * | 9/2002 | Shimada | 701/89 |
| 6,679,181 B2 * | 1/2004 | Fox | 104/20 |
| 7,147,070 B2 | 12/2006 | Leclerc | |
| 7,441,623 B2 * | 10/2008 | Casey et al. | 180/243 |
| 7,686,726 B2 * | 3/2010 | Thompson | 475/150 |
| 7,743,859 B2 * | 6/2010 | Forsyth | 180/65.1 |
| 2003/0205422 A1 * | 11/2003 | Morrow et al. | 180/65.2 |

(Continued)

FOREIGN PATENT DOCUMENTS

SU    935332 A2    6/1982
WO    0126951 A1    4/2001

OTHER PUBLICATIONS

International Search Report for corresponding International Application PCT/SE2008/000171.

(Continued)

*Primary Examiner* — John Walters
*Assistant Examiner* — James Triggs
(74) *Attorney, Agent, or Firm* — WRB-IP LLP (57) ABSTRACT

A work machine includes a front section with a front frame and a first set of ground engaging members, a rear section with a rear frame and a second set of ground engaging members, and at least one pivot joint between the front section and the rear section allowing the front section to pivot with regard to the rear section. One of the front section and the rear section includes a power source, and the other of the front section and the rear section includes at least one electric motor adapted for driving at least one of the ground engaging members.

19 Claims, 8 Drawing Sheets

U.S. PATENT DOCUMENTS

| | | | |
|---|---|---|---|
| 2004/0225425 A1* | 11/2004 | Kindo et al. | 701/36 |
| 2004/0225435 A1 | 11/2004 | Ogawa et al. | |
| 2005/0000739 A1* | 1/2005 | Leclerc | 180/14.2 |
| 2006/0191168 A1 | 8/2006 | Casey et al. | |
| 2007/0158119 A1* | 7/2007 | Pascoe | 180/65.2 |
| 2007/0193795 A1 | 8/2007 | Forsyth | |
| 2008/0022648 A1* | 1/2008 | Fox et al. | 56/341 |

OTHER PUBLICATIONS

International Preliminary Report on Patentability for corresponding International Application PCT/SE2008/000171.

Supplementary European Search Report (Mar. 8, 2013) for corresponding European App. EP08724103.

* cited by examiner

HYBRID ELECTRICAL WORKING MACHINE

BACKGROUND AND SUMMARY

The present invention relates to a work machine comprising a front section with a front frame and a first set of ground engaging members, a rear section with a rear frame and a second set of ground engaging members, and at least one pivot joint between the front section and the rear section allowing the front section to pivot with regard to the rear section, wherein one of the front section and the rear section comprises a power source.

The invention will below be described for an articulated hauler. This should however be regarded as a non-limiting example, wherein the invention may be realized in other types of articulated work machines, such as wheel loaders. Further terms frequently used for work machines are "earth-moving machinery", "off-road work machines", "construction equipment" and "forest machines". The term "ground engaging members" may comprise wheels, caterpillar tracks etc.

In connection with transportation of heavy loads, e.g. in contracting work, a work machine of the type of an articulated hauler is frequently used. Such vehicles may be operated with large and heavy loads in areas where there are no roads, for example for transports in connection with road or tunnel building, sand pits, mines, forestry and similar environments. Thus, an articulated hauler is frequently used in rough terrain with various slippery ground.

The front frame carries a power source in the form of an internal combustion engine and a load-carrying container is arranged on the rear frame of an articulated hauler. An articulated hauler is further defined by a first pivot joint arranged to allow the front frame and the rear frame to pivot in relation to each other around an imaginary longitudinal axis, that is an axis that runs in the longitudinal direction of the vehicle. Travelling on uneven ground is substantially improved by virtue of such a joint.

The articulated hauler further has a second, vertical pivot joint between the front frame and the rear frame and a pair of hydraulic cylinders for steering the work machine via pivoting the front frame relative to the rear frame about the vertical pivot axis. It is emphasized that a frame-steered work machine is adapted for an optimized off road performance with regard to any vehicle with Ackerman steering (front wheel steering). More specifically, the articulated steering creates conditions for using much larger (both with regard to diameter and width) front wheels than with so-called Ackermann steering. Further, articulated steering creates conditions for 100% lock in the front axle differential (which is not possible with Ackermann steering), which is essential when operating on slippery ground.

Further, an articulated hauler normally has six wheels. The front section comprises a front wheel axle and the rear section comprises a pair of bogie axles. A powertrain is adapted to drive the three wheel axles. Thus, the articulated hauler may be operated with all (6) wheel drive. Alternatively, an articulated hauler may be provided with eight wheels, wherein the front section carries four wheels.

Each axle is provided with a differential gear and a (transverse) differential lock. Further, one longitudinal differential lock is provided on the transmission shaft between the front axle and the bogie axles and a further longitudinal differential lock is provided on the transmission shaft between the bogie axles. The differential locks are preferably engaged when there is a risk of the wheels slipping. According to an alternative design, any of the differential locks may be replaced by a device allowing limited slip.

A conventional articulated hauler features a longitudinally installed diesel engine with a gearbox and a dropbox in line. Further, there may be some interconnecting shafts. There is a considerable interference between such an installation and the operating envelope of the front axle as well as the operator/cab connected to this layout.

Further, a specific torque distribution between the front and rear wheels has to be chosen and set during design due to the characteristics of the mechanical powertrain of the articulated hauler. Thus, the specific torque distribution can only be optimized for one specific situation.

Thus, articulated haulers are traditionally equipped with diesel engines and mechanical transmissions. It is also known with hydrostatic drive haulers, but they are generally known by heavier fuel consumption and thereby increased emissions.

Due to future decrease in oil production and more stringent emission regulations, lower fuel consumption and thereby associated lower emission impact are two of the most important features for all future machines and vessels in any branch all over the world.

It is desirable to achieve an articulated work machine, which is energy efficient in operation and which creates conditions for an improved operation.

According to an aspect of the present invention, the other of the front section and the rear section comprises at least one electric motor adapted for driving at least one of said ground engaging members.

Thus, an aspect of the invention is particularly directed to a hybrid electric work machine.

According to an aspect of the invention, in an articulated hauler, the power source is preferably arranged in the front section and the electric motor is arranged in the rear section. Thus, the front section forms a pull unit. Further, the front section comprises a cab and the rear section comprises a load-carrying container.

The electric motor creates conditions for an infinitely variable torque distribution between the wheels which is advantageous when operating in severe terrain conditions.

Regarding an articulated hauler, an aspect of the invention creates conditions for an improved performance with regard to cornering. More specifically, according to prior art, the front wheel axle and the rear wheel axles have substantially different turning radius, which may give rise to constrained torque in the mechanical powertrain from the engine to the wheels concerned. According to an aspect of the invention, since the rear wheels are driven via electrical motor(s), the mechanical transmission of power to the rear wheels may be eliminated, wherein the powertrain problems due to different turning radius are relieved. Thus, the rotation speed of the front wheel axle in relation to the bogie axles can be adjusted during cornering.

Further, the need for a mechanical transmission of motive power (comprising dropbox, propeller shafts and rear axles with final drives) to the other frame (rear frame in an articulated hauler) is eliminated. Specific fuel consumption is expected to be greatly decreased due to the fact that much less parts rotate and generate drag and due to the fact that the machine can regenerate in overrun and braking conditions. Further, the kerb weight of the machine will be significantly less, due to the absence of the dropbox, propeller shafts and rear axles with final drives. This will of course lead to lower service cost and lower production cost.

Especially, an aspect of the invention creates conditions for eliminating the transmission shaft through the pivot joint between the front section and the rear section, which is a sensitive point subjected to high load during operation. Further, a steering angle between the front section and the rear section may be substantially increased due to that the pivot joint is free of any transmission shafts.

Further, elimination of the mechanical transmission to the other vehicle section sets a lot of space free for installation of energy storage means such a batteries.

Further, an aspect of the invention creates conditions for a more efficient packaging of the powertrain components in the first frame. For example, the weight distribution may be chosen in a much more favourable way than in a conventional articulated hauler. Especially, it would be advantageous to decrease the weight in the nose in front of the front wheel axle of a conventional articulated hauler. Therefore, the internal combustion engine is preferably positioned with its main extension direction transverse relative to a longitudinal direction of the work machine. Further, this design creates conditions for reducing the distance between the front wheels and the steering joint.

Further, this invention creates conditions for eliminating the gearbox and propeller shaft passing through between the operator and the front wheel axle in conventional articulated haulers. The operator position can therefore be lowered which will substantially decrease the impact of whole body vibrations in an x-direction (fore-to-aft) and a y-direction (sideways) of the operator.

According to a preferred embodiment, the power source comprises an electric machine for providing electric power. Preferably, the power source comprises means for generating mechanical power and the electric machine is operatively connected to the mechanical power generating means for converting the mechanical power to electric power. Especially, the means for generating mechanical power is constituted by an internal combustion engine and the electric machine forms a generator. Alternatively, the electric machine may be adapted to generate electric power directly (for example a fuel cell). According to a further alternative, the electric machine may be adapted to receive electric power from an external source, such as by plugging into a stationary power supply coupled to the power grid.

According to a further development of the last mentioned embodiment, the section with the mechanical power generating means comprises means for mechanical transmission of power from the mechanical power generating means to the ground engaging members of said section. Thus, the front wheels are directly mechanically driven, wherein the rear wheels are driven by the electric motor(s). This powertrain design creates conditions for an energy efficient operation, wherein the rear wheels are only driven in slippery conditions. Thus, in non-slippery conditions and conditions with limited slip, it may be sufficient to only drive the front wheels. Thus, prior art drag losses due to rotating powertrain parts in the rear section are eliminated.

Further, torque may be infinitely variably supplied to the rear wheels in order to support the front wheel drive in certain (slippery) conditions.

Preferably, the mechanical power transmission means comprises an axle adapted to drive a pair of said ground engaging members, wherein the axle comprises a differential gear adapted to transmit power to said pair of ground engaging members and a differential lock. The differential lock creates conditions for 100% lock in the front axle differential (which is not possible with Ackermann steering), which is essential when operating on slippery ground.

According to another preferred embodiment, the internal combustion engine is positioned with its main extension direction transverse relative to a longitudinal direction of the work machine. The internal combustion engine is preferably formed by a diesel engine with the cylinders in line, e.g. a straight engine. In this case, the main extension direction is in parallel with said straight line. According to an alternative, the engine's cylinders may be arranged in a V-shape, wherein the main extension direction is perpendicular relative to a plane defined by the V. This position of the internal combustion engine creates conditions for an efficient packaging of the powertrain components in the front section. Further, since the length of the nose of the articulated hauler can be significantly reduced, the visibility from the cab for an operator is significantly improved, especially when driving upwards a slope.

Further preferred embodiment and advantages thereof emerge from the description below, the figures and the claims.

BRIEF DESCRIPTION OF FIGURES

The invention will be described in greater detail below with reference to the embodiments shown in the accompanying drawings, in which.

DETAILED DESCRIPTION

Figure 1:
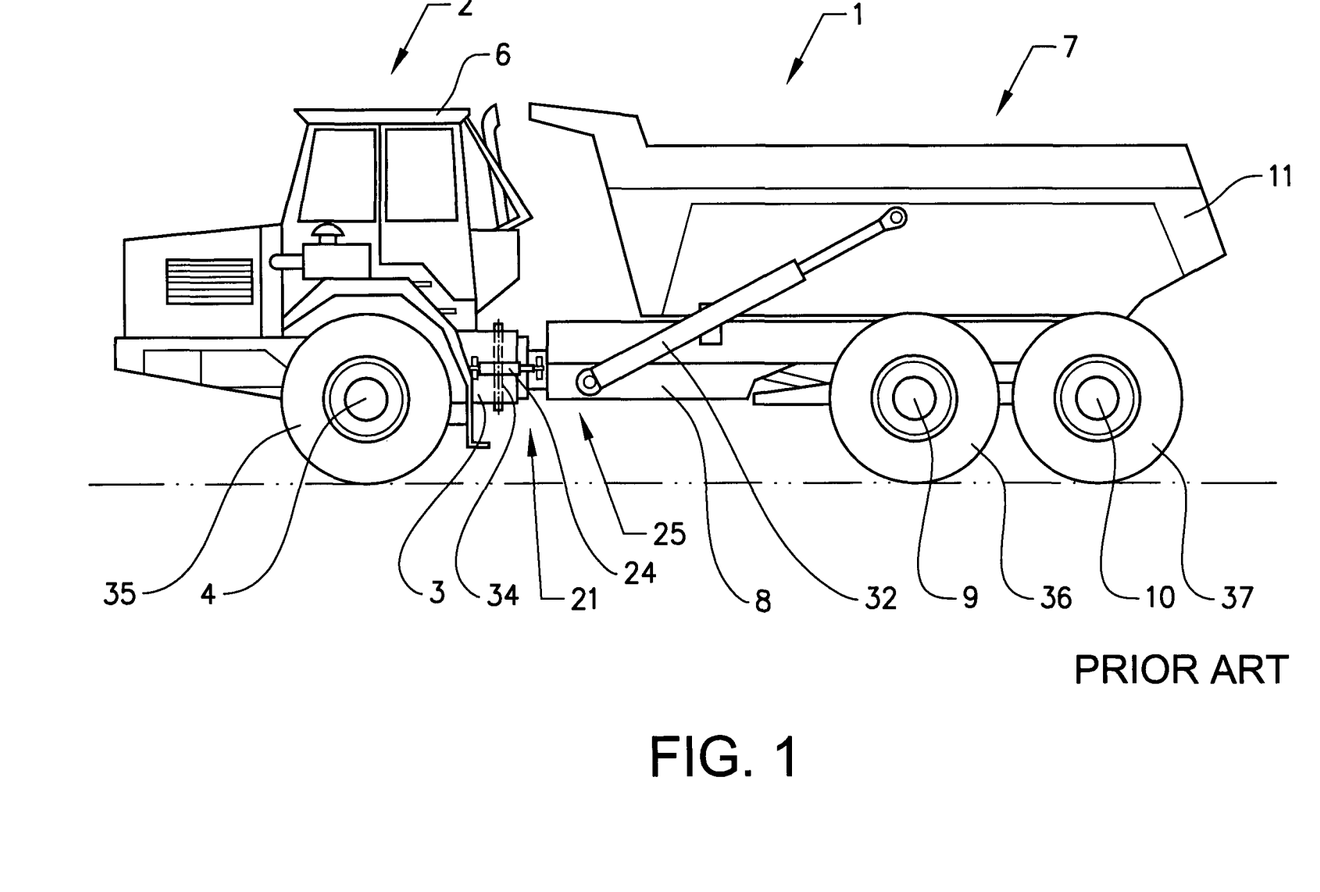
FIG. 1 shows an articulated hauler according to prior art in a side view.

FIG. 1 shows an articulated hauler (also called frame-steered dumper) 1 according to prior art in a side view. The articulated hauler comprises a front vehicle section 2 comprising a front frame 3, a front wheel axle 4 and a cab 6 for a driver. The articulated hauler 1 also comprises a rear vehicle section 7 comprising a rear frame 8, a front wheel axle 9, a rear wheel axle 10 and a tiltable container 11.

The front and rear wheel axles 9, 10 of the rear vehicle section 7 are connected to the rear frame 8 via a bogie arrangement 12, see FIG. 3, and will below be referred to as front bogie axle 9 and rear bogie axle 10. Each of the front wheel axle 4, the front bogie axle 9 and the rear bogie axle 10 comprises a left ground engagement element 35,36,37 and a right ground engagement element (not shown) in the form of wheels.

Figure 3:
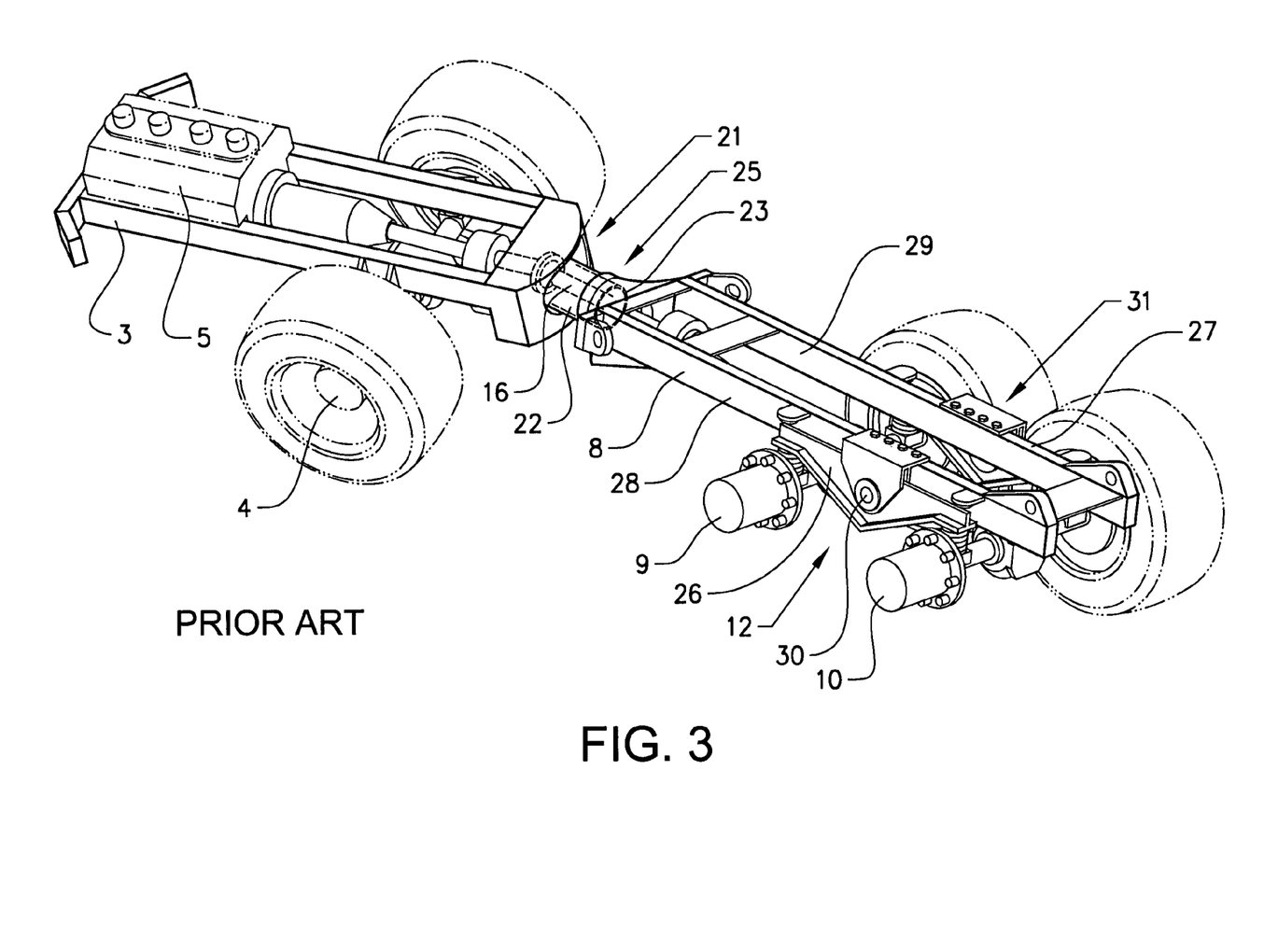
FIG. 3 shows a front frame and a rear frame in the articulated hauler in FIG. 1.

A first pivot joint 25 is adapted in order to allow the front frame 3 and the rear frame 8 to be pivoted relative to one another about an imaginary longitudinal axis, that is to say an axis which extends in the longitudinal direction of the vehicle 1, see also FIG. 3.

Figure 4:
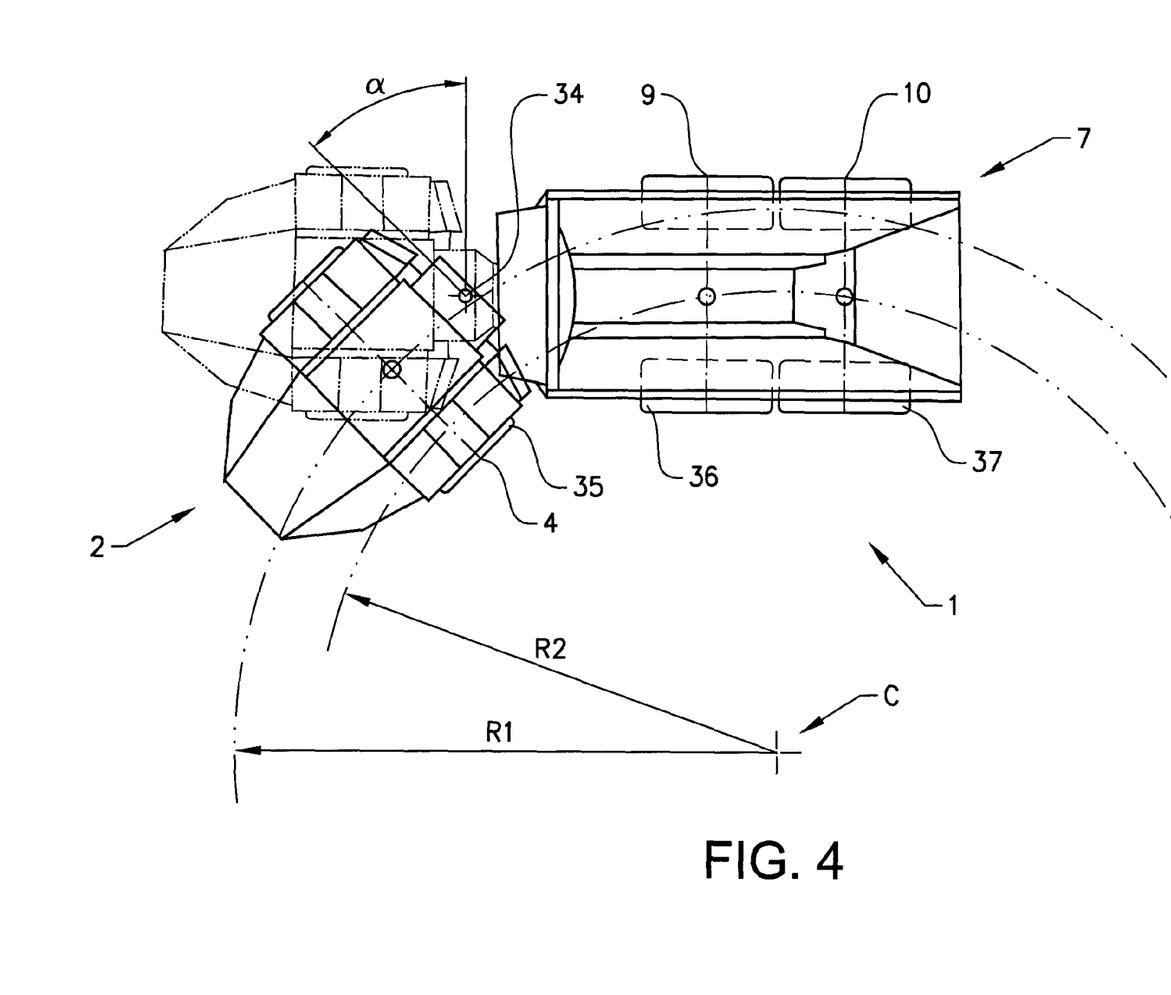
FIG. 4 shows the prior art articulated hauler in a view from above during cornering.

The front frame 3 is connected to the rear frame 8 via a second joint 21 which allows the front frame 3 and the rear frame 8 to be rotated relative to one another about a vertical axis 34 for steering (turning) the vehicle, see also FIG. 4. Actuators in the form of a pair of hydraulic cylinders 24 are arranged on respective sides of the rotary joint 21 for steering the vehicle. The hydraulic cylinders are controlled by the driver of the vehicle via a wheel and/or a joystick (not shown).

Figure 2:
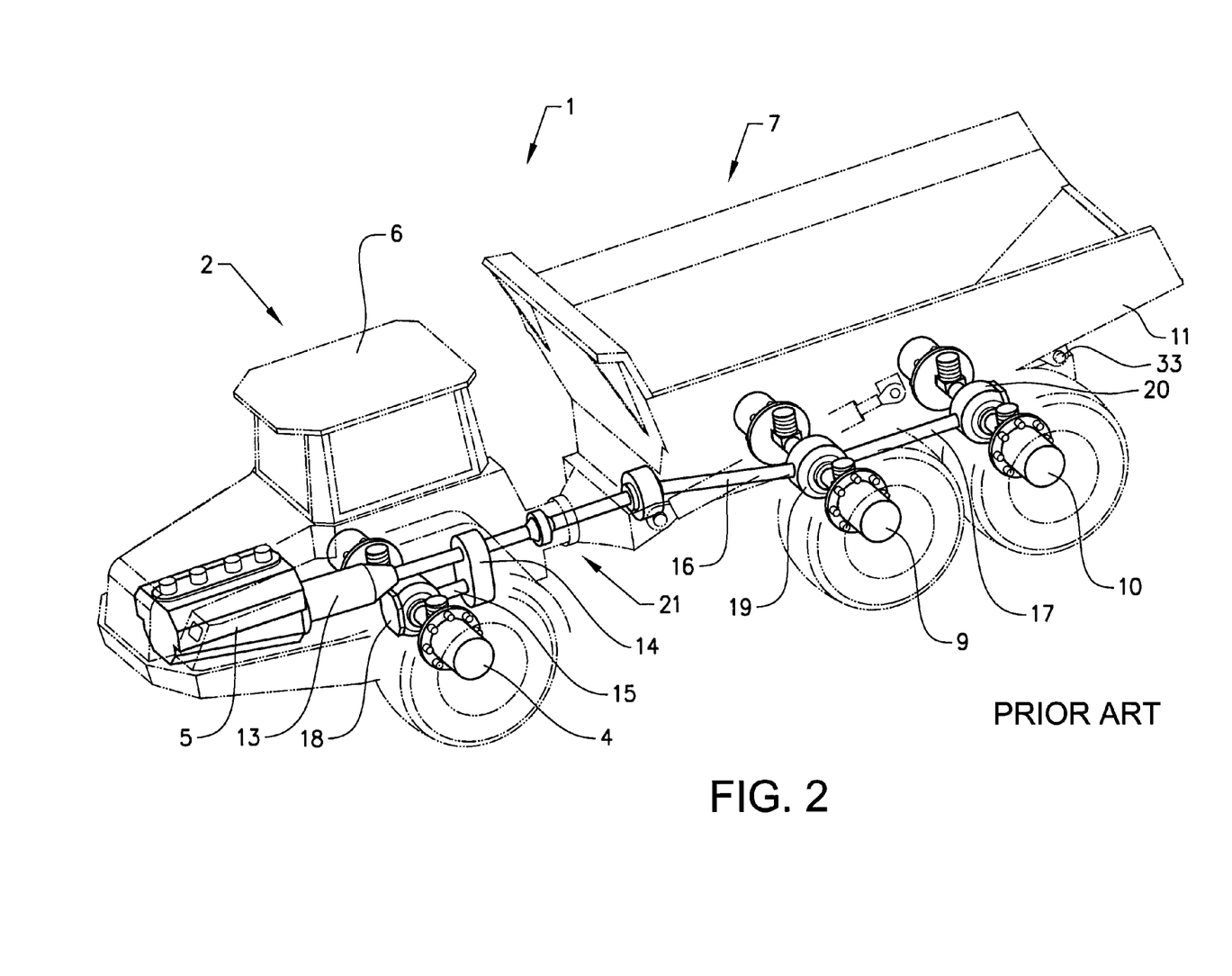
FIG. 2 shows the powertrain of the articulated hauler in FIG. 1 in a partly cutaway perspective view.

The container 11 is connected to the rear frame 8 via an articulation 33, see FIG. 2, at a rear portion of the rear frame 8. A pair of tilting cylinders 32 are connected to the rear frame 8 with a first end and connected to the platform body 11 with a second end. The tilting cylinders 32 are positioned one on each side of the central axis of the vehicle in its longitudinal direction. The platform body 11 is therefore tilted in relation to the rear frame 8 on activation of the tilting cylinders 32.

FIG. 2 schematically shows the powertrain of the articulated hauler 1. A power source in the form of an internal combustion engine (a diesel engine) 5 is adapted for propulsion of the hauler 1. The powertrain comprises a main gearbox 13 in the form of an automatic gearbox, which is operationally connected to an output shaft from the engine 5. The powertrain further comprises an intermediate gearbox 14 for distributing driving power between the front axle 4 and the two bogie axles 9, 10.

A first, second and third drive shaft 15, 16, 17 (propeller shafts) extend in the longitudinal direction of the vehicle and are each operationally connected to the transfer gearbox 14 and a central gear 18, 19, 20 in each of the wheel axles 4,9, 10. A pair of transverse drive shafts (stick axles) extend in opposite directions from the respective central gear. Each of the transverse drive shafts drives one of said wheels.

FIG. 3 shows the front frame 3 and the rear frame 8 more in detail in a perspective view. The first pivot joint 25 comprises two tubular or circular cylindrical parts 22, 23 of complementary shape relative to one another. The first tubular part 22 is anchored to the front frame 3, and the second tubular part 23 is anchored to the rear frame 8. The first tubular part 22 is received slidably in the second tubular part 23 so that the front frame 3 can be pivoted in relation to the rear frame 8 about said imaginary longitudinal axis. The second longitudinal drive shaft 16 extends through the first pivot joint 25.

In FIG. 3, the front frame 3 is in a position displaced about the first pivot joint 25 relative to the rear frame 8. Furthermore, the front frame 3 is in a position displaced about the second pivot joint 21 relative to the rear frame 8.

The bogie axles 9, 10 are mounted in the rear frame 8 via a right and left bogie element 26, 27, which elements extend essentially in the longitudinal direction of the vehicle. The bogie elements 26, 27 are rigid, in the form of beams, Each of the bogie elements 26, 27 is arranged along an adjacent longitudinal frame beam 28, 29 in the rear frame 8 and is mounted rotatably therein via a rotary joint 30,31. The bogie arrangement 12 allows a relative diagonal movement between the bogie elements 26, 27 and thus a state in which the bogie elements are positioned with different inclination in relation to a horizontal plane.

FIG. 4 shows the articulated hauler 1 in a view from above during cornering. The front vehicle section 2 is pivoted about the second rotary joint 21 in relation to the rear vehicle section 7 with a steering angle α. As the distance between each wheel axle 4, 9, 10 and the vertical pin 34 which forms the joint between the front and rear vehicle sections 2, 7 differs greatly, the wheels will follow different turning radii during cornering. The front wheel axle 4 will follow the turning radius R1, while the bogie axles 9, 10 will follow the turning radius R2. As the turning radius R1 of the front wheel axle 4 is considerably larger than the turning radius R2 of the bogie axles 9, 10, the wheels 35 on the front wheel axle 4 have to cover a considerably greater distance than the wheels 36,37 on the two bogie axles 9, 10.

Furthermore, the external wheels have to rotate faster than the internal wheels in a bend. The driven wheels therefore have to rotate at different speed. Furthermore, the front wheels have to rotate faster than the rear wheels owing to the different radii for the front axle 4 and the bogie axles 9, 10.

In order to prevent these differences giving rise to constrained torque in the drive line from the engine 5 to the wheels concerned, it is necessary to regulate the rotation speed of the front wheel axle 4 in relation to the bogie axles 9, 10 and between internal and external wheels during cornering.

The problem of distributing tractive power in an effective way during cornering as well is conventionally solved by dividing the torque in a given, fixed ratio with the aid of a differential. The rotation speed is then controlled by the speed of the ground at the various ground contact points and by the slip. However, the slip cannot be controlled. If the product of vertical load and ground friction does not correspond to the torque ratio in the differential, the slip can increase unlimitedly, the wheels slip and the total tractive power transmitted is limited by the slipping ground contact.

The problem of uncontrolled slip is usually reduced by various measures for braking the slip, for example by using what is known as a differential lock. The differential lock conventionally consists of or comprises a claw coupling which locks the differential mechanically. The disadvantage of differential locks is that the speed difference during cornering is offset as slip at the ground contact points concerned. This results in great constrained torques which shorten the life of the drive line, give rise to losses and cause great tire wear.

Figure 5:
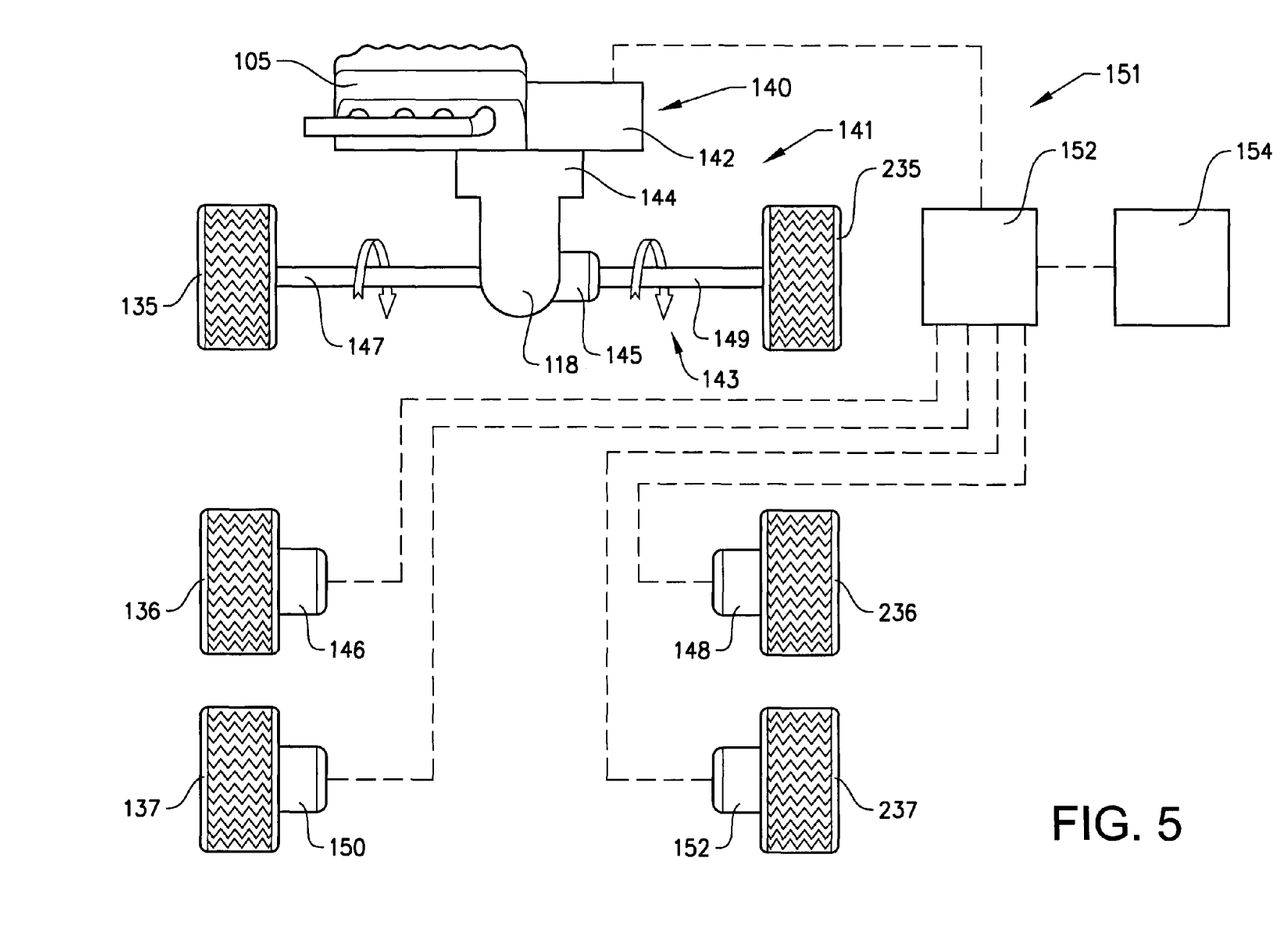
FIG. 5 schematically shows a powertrain according to a first embodiment of the present invention.

FIG. 5 schematically shows a powertrain according to a first embodiment of the present invention. The powertrain comprises a power source 140. The power source 140 comprises means for generating mechanical power 105 and an electric machine 142 operatively connected to the mechanical power generating means 105 for converting the mechanical power to electric power. The mechanical power generating means 105 comprises an internal combustion engine in the form of a diesel engine.

The powertrain further comprises means 141 for mechanical transmission of power from the internal combustion engine 105 to the ground engaging members 135, 235 of said section. The mechanical power transmission means 141 comprises a gear box 144 and an axle 143 adapted to drive a pair of said ground engaging members 135, 235. The mechanical power transmission means 141 preferably comprises a combined gear box 144 and transmission unit 118 for transmitting power from the internal combustion engine 105 to a pair of transverse drive shafts 147, 149. The transmission unit 118 may comprise a toothed wheel gearing, bevel gears and cardan shaft, belt drive or chain drive or other transmission member for performing said power transmission. The transmission unit 118 further preferably comprises a differential gear adapted to transmit power to said pair of ground engaging members and a differential lock 145 adapted to lock the pair of transverse drive shafts 147, 149 together.

At least one electric motor 146, 148, 150, 152 is adapted for driving at least one ground engaging member 136, 236, 137, 237 in the rear section, preferably via a reduction gear. More specifically, a plurality of electric motors 146, 148, 150, 152 are adapted for driving one of said ground engaging members 136, 236, 137, 237 each. Thus, four electric motors are arranged, one at each wheel.

The work machine further comprises means 151 for electrical transmission of power from the electric machine 142 to said at least one electric motor 146, 148, 150, 152. The work machine further comprises a power electronic unit 152 adapted to distribute electric power to the respective electric motors 146, 148, 150, 152. The dotted lines in FIG. 6 indicate lines for transmission of electric current.

Further, the work machine comprises at least one electric power storing means 154, which is operatively connected to said at least one electric motor 146, 148, 150, 152. The electric power storing means 154 is operatively connected to the power electronic unit 152.

Figure 6:
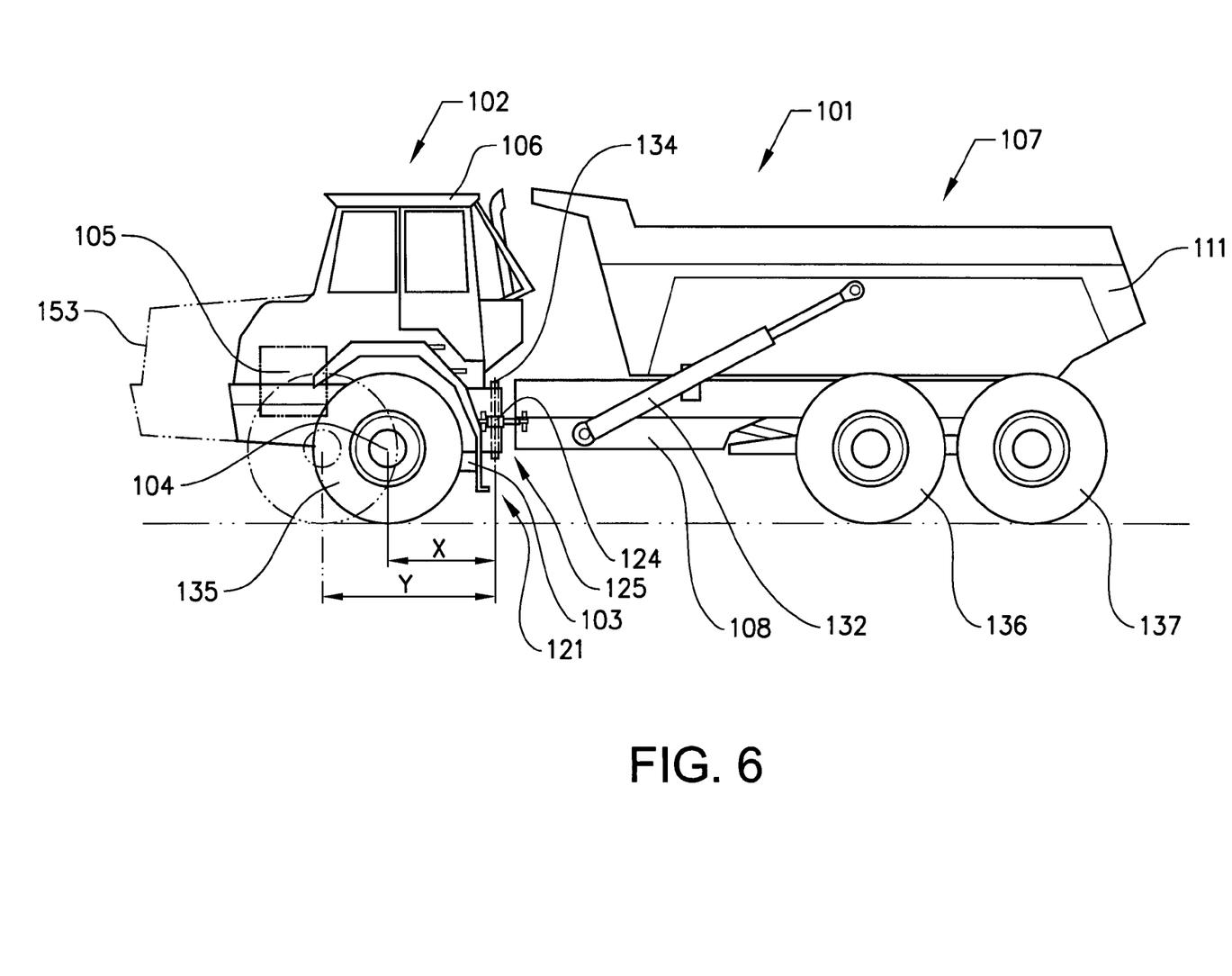
FIG. 6 shows an articulated hauler according the first embodiment in a side view.

FIG. 6 shows an articulated hauler 101 according to the first embodiment of the present invention. The articulated hauler comprises a front vehicle section 102 comprising a front frame 103, a front wheel axle 104 and a cab 106 for a driver. The articulated hauler 101 also comprises a rear vehicle section 107 comprising a rear frame 108, said four wheels 136, 236, 137, 237 and a tiltable container 111.

Figure 8:
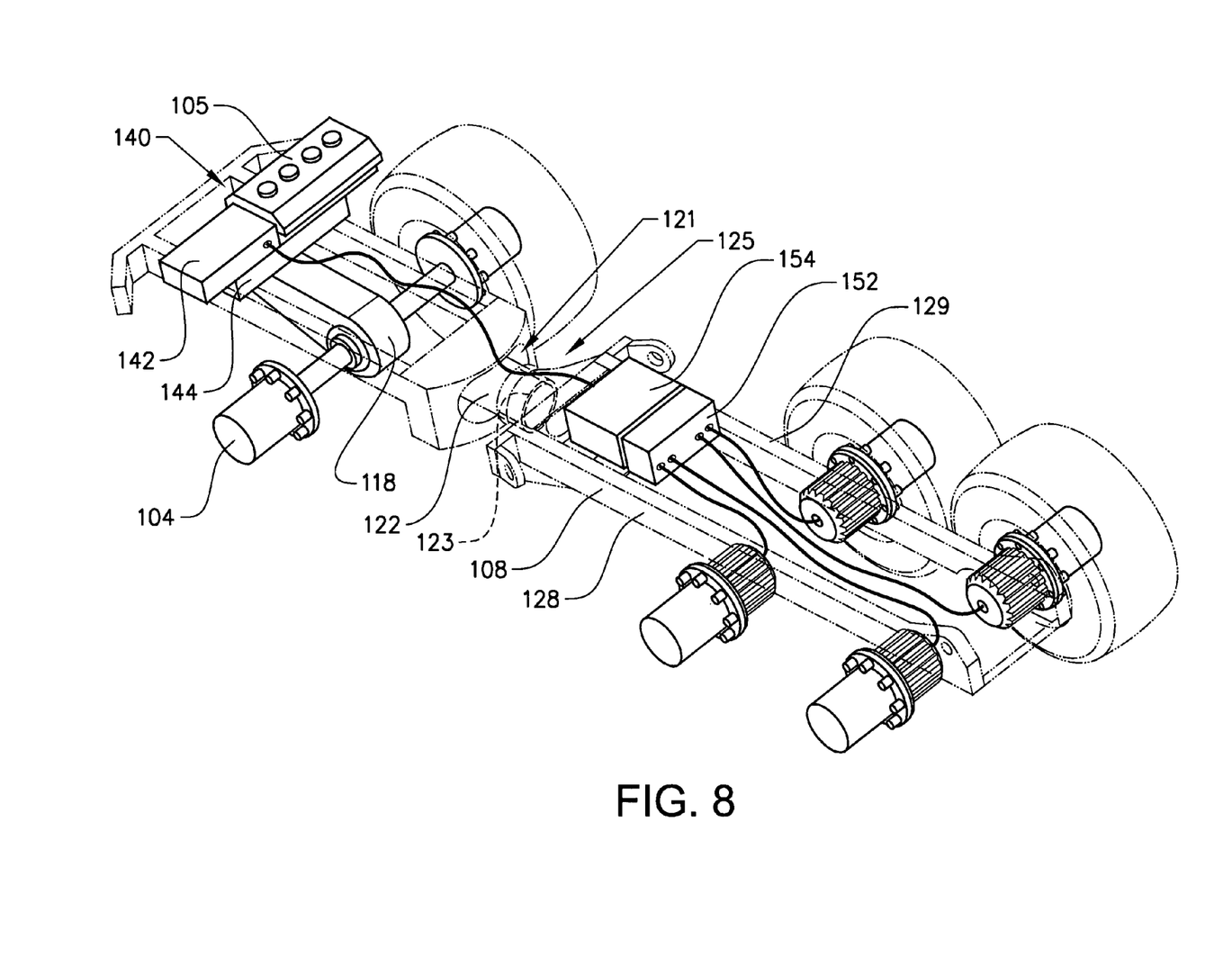
FIG. 8 shows a front frame and a rear frame of the first embodiment.

A first pivot joint 125 is adapted in order to allow the front frame 103 and the rear frame 108 to be pivoted relative to one another about an imaginary longitudinal axis, that is to say an axis which extends in the longitudinal direction of the vehicle 101, see also FIG. 8.

The front frame 103 is connected to the rear frame 108 via a second joint 121 which allows the front frame 103 and the rear frame 108 to be rotated relative to one another about a vertical axis 134 for steering (turning) the vehicle. Actuators in the form of a pair of hydraulic cylinders 124 are arranged on respective sides of the rotary joint 121 for steering the vehicle. The hydraulic cylinders are controlled by the driver of the vehicle via a wheel and/or a joystick (not shown).

Figure 7:
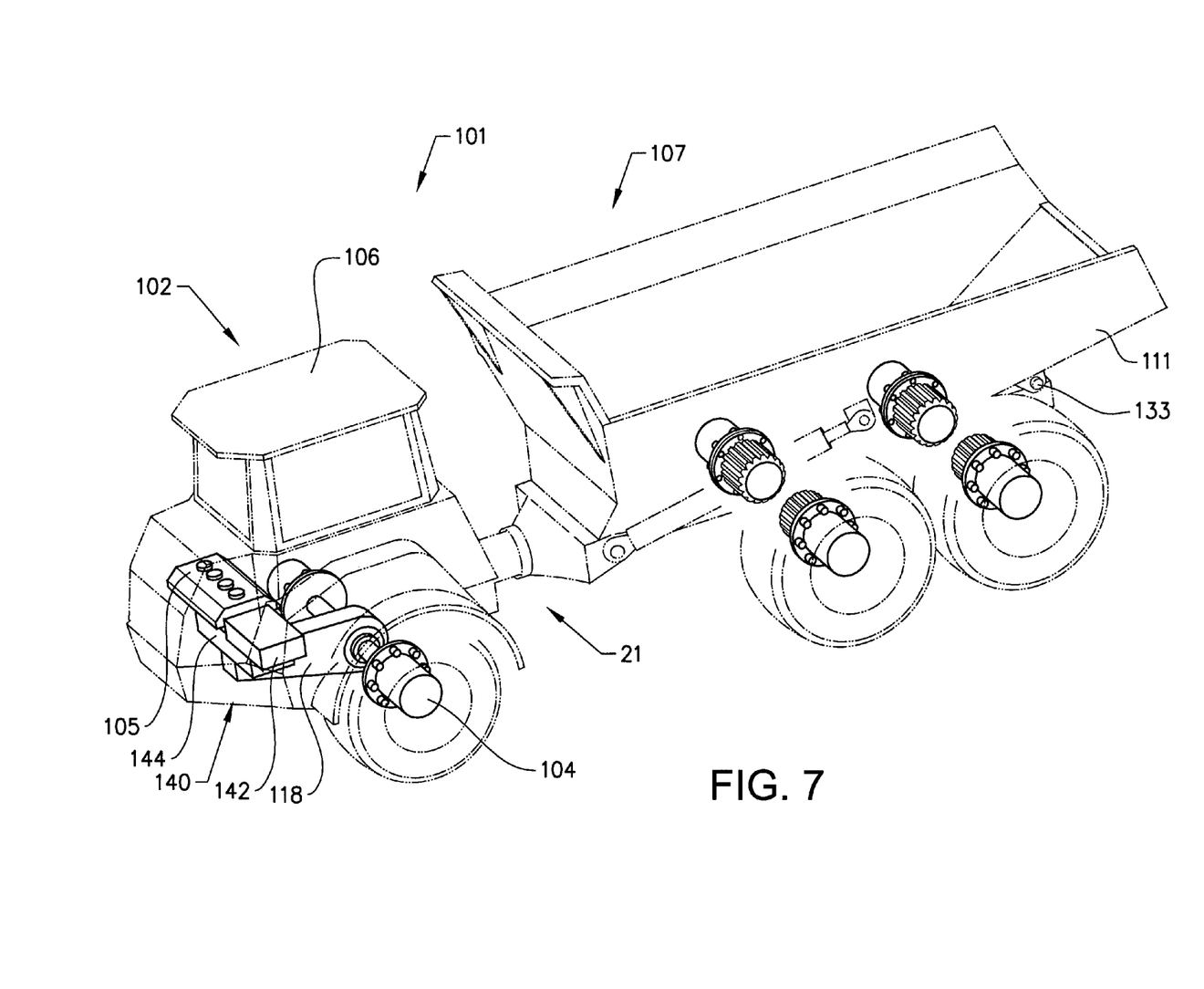
FIG. 7 shows the powertrain of the first embodiment in a partly cutaway perspective view.

The container 111 is connected to the rear frame 108 via an articulation 133, see FIG. 7, at a rear portion of the rear frame 108. A pair of tilting cylinders 132 are connected to the rear frame 108 with a first end and connected to the platform body 111 with a second end. The tilting cylinders 132 are positioned one on each side of the central axis of the vehicle in its longitudinal direction. The platform body 111 is therefore tilted in relation to the rear frame 108 on activation of the tilting cylinders 132.

The internal combustion engine 105 is arranged in a transverse direction with regard to the longitudinal direction of the articulated hauler, see FIGS. 6-8. The internal combustion engine 105 is positioned with its main extension direction in parallel with the front axle 104. The prior art nose of the articulated hauler (see dotted line 153), which housed the previously longitudinally arranged internal combustion engine (see FIG. 2) is eliminated. Due to the new position of the internal combustion engine (and the further powertrain parts, see FIG. 7), the weight distribution of the front section 102 is changed. By virtue of the new weight distribution of the front section 102, the front wheel axle can be positioned closer to the steering joint 121, compare distance X and Y in FIG. 6.

FIG. 7 shows the powertrain in more detail in a perspective view. Especially, the position of the internal combustion engine 105, the electric generator 142 and the gear box 144 with regard to the front axle 104 is shown. Further, all the prior art powertrain components for transmitting power from the internal combustion engine to the rear wheels are eliminated, compare with FIG. 2.

FIG. 8 shows the front frame 103 and the rear frame 108 more in detail in a perspective view. The first pivot joint 125 comprises two tubular or circular cylindrical parts 122, 123 of complementary shape relative to one another. The first tubular part 122 is anchored to the front frame 103, and the second tubular part 123 is anchored to the rear frame 108. The first tubular part 122 is received slidably in the second tubular part 123 so that the front frame 103 can be pivoted in relation to the rear frame 108 about said imaginary longitudinal axis.

Said at least one electric power storing means 154 is positioned between two spaced, elongated frame members 128, 129 which extend in a longitudinal direction of the work machine.

The electric motors 146, 148, 150, 152 are adapted for both driving and braking the driving wheels 136, 236, 137, 237.

According to an alternative to the described first embodiment, in addition to the mechanical drive of the front wheels 135, 235, at least one electric motor is adapted to drive the front wheels 135, 235. Preferably, one electric motor is adapted to drive an individual wheel 135, 235.

Further, the work machine comprises a control system (not shown) for controlling the power distribution. The control system comprises a control unit with software for controlling the power distribution. Thus, the control unit is connected to the energy storage means 154 for controlling transfer of power to and from the energy storage means according to an established control strategy, see further below.

The control unit is commonly known as an Electronic Control Unit (ECU), a Central Processing Unit (CPU) or an Electronic Control Module (ECM) for an electronic control of the vehicle operation. In a preferred embodiment, the control unit comprises a microprocessor. The control unit comprises a memory, which in turn comprises a computer program with computer program segments, or a program code, for implementing the control method when the program is run. This computer program can be transmitted to the control unit in various ways via a transmission signal, for example by downloading from another computer, via wire and/or wirelessly, or by installation in a memory circuit. In particular, the transmission signal can be transmitted via the Internet.

Electrical power generated by the electric generator or alternator 142 and not required by the traction motors 146, 148, 150, 152 to drive the work machine 101, or electrical power generated by the traction motor 146, 148, 150, 152 from regenerative braking, can be stored in the energy storage means 154. Further, the flow of fuel to the engine 105 can be shut off, reduced, or tapered down correspondingly.

In other words, a difference between the power actually generated by the power generator 140 and the amount of power required to actually drive the work machine 101 can be accommodated by the associated energy storage means 154. For example, the internal combustion engine 105 may be operated most efficiently at wide open throttle, then, under driving conditions for which the power output level of the power generator 140 is greater than that necessary to drive the work machine, either the excess power from the power generator 140 can be stored in the energy storage means 154, or, if there was sufficient stored energy in the energy storage means 154, the work machine could be operated strictly on energy from the energy storage means 154 without operating the power generator 140. Under driving conditions requiring more power than can be generated by the power generator 140, the work machine can be operated from energy stored in the energy storage means 154, and if necessary, power generated by the power generator 140. Accordingly, the control of the hybrid vehicle system involves determining whether or not, and if so, under what conditions, to run the power generator 140, whether to store energy in the energy storage means 154 or to utilize energy therefrom.

Alternative no. 1: Propulsion management directs the torque in the principles noted below:
1. All situations. Mechanical to front wheels differential open.
2. Start and when slipping is noted. As in §1 and balanced to rear wheels.

3. When slipping is noted. Mechanical to front wheels, differential locked.
4. When accumulator is in high state of charge. Electrical to front wheels.
5. When accumulator is in high state of charge. Electrical to rear wheels.

Alt. 2 Propulsion management directs the torque in the principles noted below:
1. All situations. Mechanical to front wheels differential open.
2. When slipping is noted. Mechanical to front wheels, differential locked.
3. Start and when slipping is noted. As in §2 and balanced to rear wheels.
4. When accumulator is in high state of charge. Electrical to front wheels.
5. When accumulator is in high state of charge. Electrical to rear wheels.

The propulsion management can also be a combination of the alternatives above and of course adaptive.

Thus, when the accumulator is in high state of charge the diesel engine shall automatically be throttled down accordingly to available electrical power. The operator controls the total demand of torque and the propulsion management system is balancing the output from the diesel engine and the electrical motors with reference to slipping and driving condition and state of charge of the accumulator. The system shall be optimised for minimum fuel consumption and shall regenerate electrical power at any time it is possible.

Electrical power will mainly be directed from the electric power storage means but can be directed from the engine driven electrical machine in situations when the electric power storage means is in a low state of charge and there is a need of rear wheel torque. In high speed situations the torque is expected to be distributed to the front wheels only which means it can be generated from the diesel engine and transmitted directly to the front wheels.

The invention is not to be regarded as being limited to the illustrative embodiments described above, but a number of further variants and modifications are conceivable within the scope of the patent claims below.

The invention has been described above for an articulated hauler, wherein the power source is arranged in the front section and the electric motor is arranged in the rear section. However, the invention may also be applied in a wheel loader, wherein the power source is arranged in the rear section and the electric motor is arranged in the front section.

Further, in a wheel loader, the rear section comprises a cab and the front section comprises a work implement, such as a bucket, which is pivotally arranged on a pivotable boom.

As an alternative to the described first embodiment, the work machine comprises at least two axles arranged on the section with the electric motors, and that each axle is adapted to drive a ground engaging member at each side of the work machine. One single electric motor may be adapted to drive each axle. Thus, a single electric motor is adapted to drive one pair of wheels. Said at least two axles may be connected via a bogie beam on each side of the work machine.

Within the scope of the invention, the power source can be designed in many different ways. Preferably, it is adapted to provide electricity. One option is to use a fuel cell for providing electricity. A further solution is to use a gas turbine provided with an electric generator. The source of electric power can also be a free-piston engine provided with an electric generator.

The electricity for propelling the work machine can come from a variety of sources, such as stored energy devices relying on chemical conversions (batteries), stored electrical charge devices (capacitors), stored energy devices relying on mechanical stored energy (e.g. flywheels, pressure accumulators) end energy conversion products.

Further, the energy storage means 154 can be charged from a stationary electrical power source, e.g. when the work machine is parked, by plugging into a stationary power supply coupled to the power grid, as an alternative to charging with the power generator 140 during operation of the work machine 101.

The invention claimed is:

1. A work machine comprising a front section with a front frame and a first set of ground engaging members, a rear section with a rear frame and a second set of ground engaging members, and at least one pivot joint between the front section and the rear section allowing the front section to pivot with regard to the rear section, wherein one of the front section and the rear section comprises a power source, wherein the other of the front section and the rear section comprises at least one electric motor adapted for driving at least one of the ground engaging members, and wherein the power source comprises an electric machine for providing electric power, and the work machine further comprises means for electrical transmission of power from the electric machine to the at least one electric motor, wherein the power source comprises means for generating mechanical power, the section with the mechanical power generating means comprising means for mechanical transmission of power from the mechanical power generating means to the ground engaging members of the section.

2. The work machine according to claim 1, wherein the means for generating mechanical power comprises an internal combustion engine.

3. The work machine according to claim 2, wherein the internal combustion engine is positioned with its main extension direction transverse relative to a longitudinal direction of the work machine.

4. The work machine according to claim 1, wherein the mechanical power transmission means comprises an axle adapted to drive a pair of the ground engaging members.

5. The work machine according to claim 4, wherein the axle comprises a differential gear adapted to transmit power to the pair of ground engaging members and a differential lock.

6. The work machine according to claim 1, wherein electric machine is operatively connected to the mechanical power generating means for converting the mechanical power to electric power.

7. The work machine according to claim 1, wherein the electrical transmission means comprises a line for transmission of electric power to the electric motor and that the electric power transmission line extends through the pivot joint.

8. The work machine according to claim 1, wherein the work machine comprises a first pivot joint adapted to allow the front section to pivot with regard to the rear section about an axis extending in a longitudinal direction of the work machine.

9. The work machine according to claim 1, wherein the work machine comprises a second pivot joint adapted to allow the front section to pivot with regard to the rear section about an axis extending in a vertical direction of the work machine and that the work machine comprises means for steering the work machine via pivoting the front section relative to the rear section about the vertical pivot axis.

10. The work machine according to claim 9, wherein the steering means comprises a hydraulic actuator arranged on each side of the second pivot joint.

11. The work machine according to claim 1, wherein the work machine comprises at least one electric power storing means which is operatively connected to the at least one electric motor.

12. The work machine according to claim 11, wherein the at least one electric power storing means is positioned in the same section as the electric motor.

13. The work, machine according to claim 11, wherein the at least one electric power storing means is positioned between two spaced, elongated frame members which extend in a longitudinal direction of the work machine.

14. The work machine according to claim 1, wherein the work machine comprises at least two electric motors and that each electric motor is adapted to drive an individual ground engaging member.

15. The work machine according to claim 14, wherein the section with the electric motors comprises at least two rotary members on each transverse side, each of which is adapted to drive a ground engaging member.

16. The work machine according to claim 1, wherein the front section comprises the power source and that the rear section comprises the electric motor.

17. The work machine according to claim 1, wherein the work machine comprises a load carrying means.

18. The work machine according to claim 17, wherein the load carrying means comprises a container which is arranged on the rear section.

19. The work machine according to claim 1, wherein the work machine comprises an articulated hauler.

* * * * *